Nov. 9, 1971  H. E. KREFFT  3,618,186

METHOD OF MAKING VACUUM CAPACITORS

Filed Sept. 8, 1969

INVENTOR
HERMAN E. KREFFT
BY
ATTORNEY

United States Patent Office 3,618,186
Patented Nov. 9, 1971

3,618,186
METHOD OF MAKING VACUUM CAPACITORS
Herman E. Krefft, Matawan, N.J., assignor to International Telephone and Telegraph Corporation, New York, N.Y.
Filed Sept. 8, 1969, Ser. No. 855,956
Int. Cl. H01g 13/00
U.S. Cl. 29—25.41          7 Claims

ABSTRACT OF THE DISCLOSURE

The disclosure includes a method of processing a vacuum device such as a vacuum capacitor so as to increase its useful life under conditions of superimposed direct current, far beyond the present state of the art. Vacuum capacitors, when used as DC blocking capacitors in RF circuits, slowly degrade in voltage capability. The degradation becomes apparent when DC or DC plus RF voltages are applied to the capacitor. The present disclosure solves the degradation problem by applying an alternating voltage to the capacitor electrodes in the presence of an inert gas at low pressure and hermetically sealing the capacitor without the removal of adsorbed gas.

BACKGROUND OF THE INVENTION

This invention relates to a method of processing the electrodes in high voltage vacuum devices and to the improvement of their electrical characteristics and of their useful life. More particularly, it relates to a manufacturing method for vacuum capacitors.

It is known that vacuum capacitors possess, in principle, highly desirable electrical characteristics. They can be operated at high voltages, and an occasional electrical breakdown does not make them inoperable as their dielectric medium consists of high vacuum; for the same reason, heat dissipation is very low. However, these characteristics are not easy to obtain in a manufacturing operation and require costly equipment and lengthy and hazardous high voltage processing which frequently results in poor manufacturing yields and a high percentage of substandard specimens. In practical applications, reliability is often found questionable as their voltage capability tends to deteriorate and heat dissipation increases. This degradation is particularly noticeable in capacitors which are used for DC blocking in high frequency circuits when the applied potential has a unidirectional component. Under this condition, the typical vacuum capacitor is not stable, tends to heat up, and will hold off less and less voltage and will arc over at increasingly more frequent intervals unless the applied voltages are reduced. This effect has limited the use of vacuum capacitors to those applications where only alternating current without a DC component flows through the capacitor.

In numerous attempts to overcome these difficulties and attain optimum performance, it has become standard practice in the manufacture of vacuum capacitors to carry out thermal and electrical processing under a vacuum of the order of at least $10^{-6}$ torr, and even lower pressures of the order of $10^{-8}$ torr are considered very desirable. This requires the use of expensive equipment and of time consuming exhaust schedules. In spite of these efforts, no substantial improvements have been obtained with these conventional procedures.

In view of this situation, the primary objective of the present invention is a processing method for vacuum capacitors through which their manufacture is facilitated and capacitors with long useful lives, high voltage capability, and stable characteristics are obtained. These improvements are attained by carrying out electrical processing under a controlled atmosphere of an inert gas introduced into the capacitor at a suitable pressure, and by permitting the condition produced at the electrode surfaces by ion bombardment and gas clean-up to remain unchanged in the capacitor after its removal from the exhaust system.

The beneficial effect of a gas which is present during the high voltage processing of electrodes has been noted before in the course of experimental investigations of the electrical breakdown in a high vacuum. This event is always preceded by electron emission which is induced by high electrical fields. In a generally accepted model for this phenomenon, it is assumed that this field emission originates at the tips of microscopic protrusions which exist in large numbers at the electrode surface and locally strengthen the electrical field by their geometrical shape. Removal or blunting of the tips by arcing or ion bombardment results in lower emission currents and in an improved voltage capability of the electrodes. The effect of ion bombardment is enhanced if the number of ions is increased by permitting the pressure to rise during processing. However, the improvement was not found to be of a lasting nature, and its eventual stability over long periods of time was not tested since the experimental electrode systems investigated in these experiments were not self-contained vacuum devices which could be separated from the exhaust apparatus and tested as independent units.

In the manufacture of vacuum capacitors, a similar effect was observed when the pressure was permitted, sometimes accidentally through failure of the vacuum system, to rise above the usual high vacuum level. In such cases, the nature and composition of the atmosphere was not known; and pains were taken to restore a high vacuum and remove all the gases which could have contaminated the electrodes. Capacitors so processed did not exhibit improved voltage hold-off or long term stability.

SUMMARY OF THE INVENTION

In accordance with the method of the present invention, the above-described and other disadvantages of the prior art are overcome by applying an alternating voltage to the electrodes of a vacuum capacitor in the presence of an inert gas at low pressure and sealing off the pumping tubulation of the capacitor without removal of adsorbed gas by electrical or thermal treatment prior to seal-off.

A typical vacuum capacitor comprises an intermeshed set of cylindrical capacitor elements hermetically sealable in an envelope. After assembly of the capacitor by brazing and/or welding operations, the pumping tubulation of the capacitor is attached to a high vacuum pump, then it is evacuated and heated to a temperature in the range of from 450 to 550 degrees centigrade and maintained at this temperature until gas evolution from the internal surfaces has essentially ceased. After being allowed to cool, the capacitor is typically subjected to an AC voltage supplied by a high voltage transformer, the voltage drop between the capacitor electrodes being raised gradually to a design value. In the past, this operation was carried out under a high vacuum; and the capacitor was subsequently sealed off by pinching shut the pumping tubulation under high vacuum conditions.

In accordance with the present invention, the capacitor is subjected to the same evacuation and bakeout sequence. However, before the capacitor is sealed, at least the following new steps are performed. Without sealing the capacitor, the capacitor is allowed to cool and an inert gas is admitted to its interior. The pressure in the capacitor is increased to just below the ionization range by admitting the inert gas. After the above steps have been performed, the capacitor is subjected to an alternating voltage. The capacitor is then sealed off after completion of the high voltage processing step, without further thermal or electrical treatment. This change is processing method which runs counter to established techniques, has a vast effect on the quality of capacitors in general and on their behavior in RF circuits operating with DC bias. Such capacitors which previously had a useful life of a few hours can be operated for thousands of hours without voltage degradation.

Vacuum capacitors are unique vacuum devices. By their very nature, they possess electrodes with very large surface areas which face each other at a small distances, the spacings being of the order of 10 to 100 thousandths of an inch. Owing to this characteristic and the inherently high capacitance of the device, a voltage breakdown during processing can severely damage the electrodes since the stored energy is high. This danger makes it necessary to increase voltage very slowly during processing under high vacuum when violent arcing is likely to happen. Under a gas atmosphere, this danger is greatly reduced as protruding emission spots are readily removed by ion bombardment. Also, the formation of new high spots is less probable. Actually, the prominence of such spots is reduced by space-charge effect of the positive ions; and a much larger number of small, otherwise inactive, emission centers contributes to the emission current whose magnitude is appreciably reduced. High voltage processing, therefore, can be carried out more safely and at higher voltage levels, and in less time when a gas is present.

The gas pressure at which high voltage processing is done with optimum results, depends on the nature of the gas and on the spacings between the electrodes as provided by design and as they actually are in an assembled capacitor unit. In accordance with Paschen's Law which relates breakdown voltage in gases to the product of pressure and electrode spacing, it is set at a level that no ionization occurs between the electrodes; and the full voltage supplied by the transformer is maintained across the capacitor. Typically, the pressure is of the order of $10^{-4}$ to $10^{-3}$ torr. The quantity of gas adsorbed at the electrode surfaces is automatically determined by the clean-up process caused by the high voltage operation of the capacitor.

Actually, the improveemnt brought about by the new method was not expected to be of a long duration, and to the contrary, a speedy relapse and the usual degradation of the capacitor and undesirable side effects were considered unavoidable. Pure reseach and experiments with capacitors seemed to confirm this opinion. Processed capacitors which were kept under a high vacuum while still connected to the pump, showed a gradual increase in emission and a decrease in voltage capability until the usual level of high vacuum processed capacitors was reached. This degradation took place within minutes when high voltage was applied between the electrodes, and the capacitor warmed up through dissipation caused by rising emission.

The problem of obtaining capacitors with permanently improved characteristics was solved by permitting the quantity of gas adsorbed at the electrode surfaces during high voltage processing to remain in the capacitor. To this end, the pumping tubulation of the capacitor is sealed off shortly after the completion of this processing step without removal of adsorbed gas by electrical or thermal treatment.

Capacitors processed according to this and the preceding steps of the present invention have far superior stability even under DC bias than those that are not. The mechanism of the improvements effected by the new method has been explained as far as the state of the art permits, and it may be assumed that the inert gas is mainly in an adsorbed state and bound to the electrode surface. If some of it exists in a free state, it does not significantly affect the insulating properties of the interelectrode space as would any large concentration of gas molecules. Should an electrical breakdown occur during operation at some point between the electrodes, local heating and liberation of adsorbed gas would result. Ions are then produced by electron impact through which the emitting point is made ineffective in a manner already described. In a similar way, eventually rising emission is compensated by an increase in density of the free gas which is due to the dislocation of adsorbed gas molecules caused by growing dissipation and temperature rise of the electrodes. Thus, the new processing method provides an automatic mechanism for the self repair and stabilization of a vacuum capacitor, and it also furnishes just the right amount of gas individually required by a capacitor in order to produce and maintain all the improvements described.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
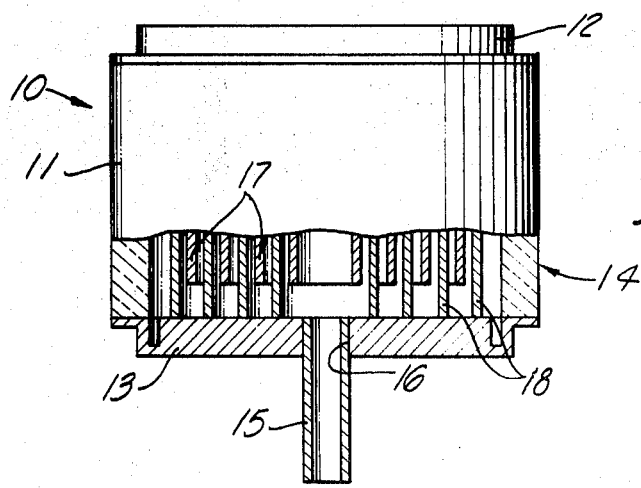
FIG. 1 is a side elevational view of a vacuum capacitor, partly in section.

In the drawings, in FIG. 1, a conventional vacuum capacitor before it is sealed up, is indicated at 10 having an envelope 11 including a copper plate 12, a copper plate 13, and an insulating cylinder 14. A copper tube 15 is bonded inside a hole 16 in plate 13. Plates 12 and 13 may be identical except for hole 16. Electrical connections may be made to capacitor 10 at plates 12 and 13. Copper cylinders 17 are bonded to plate 12. Other copper cylinders 18 are bonded to plate 13. Cylinders 17 and 18 terminate short of and out of electrical contact with each other and plates 13 and 12, respectively. All of the cylinders 17 and 18 are concentric and equally spaced from each other.

Figure 2:
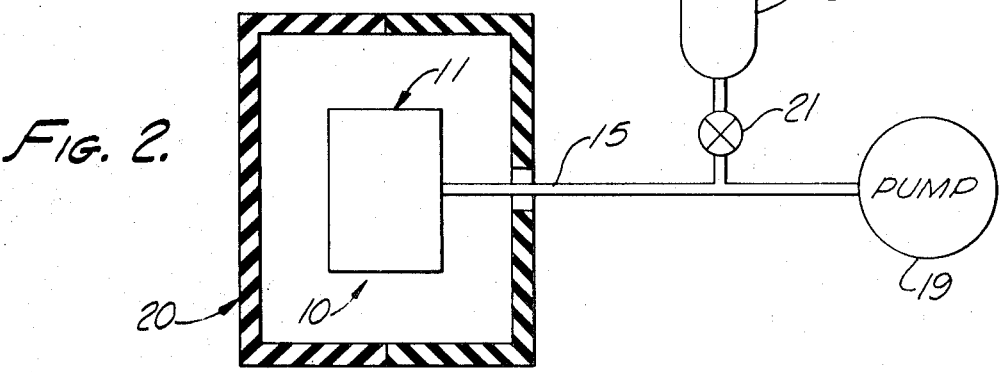
FIG. 2 is a schematic diagram of outgassing and gas supply apparatus.

Conventionally, capacitor 10 is heated to between about 450 and 550 degrees centrigrade. At the same time, gases liberated inside envelope 11 are withdrawn therefrom until the pressure inside envelope 11 falls to from about $10^{-4}$ to $10^{-8}$ torr. Apparatus for this conventional process and further processing in accordance with the present invention is shown in FIG. 2.

The foregoing operation is called outgassing. Gas, in fact, is pumped from the interior of envelope 11 as shown in FIG. 2 through tube 15 by a vacuum pump 19. Envelope 11 is located inside an oven 20.

Conventional outgassing which may include intermediate flushing with a gas, is performed preparatory to the steps of the present invention. Outgassing is performed with a valve 21 closed.

Once outgassing has taken place, capacitor 10 is allowed to cool to room temperature. Valve 21 is then cracked to admit an inert gas to the interior of envelope 11. Inert gas is contained in a container in a container 22.

Figure 3:
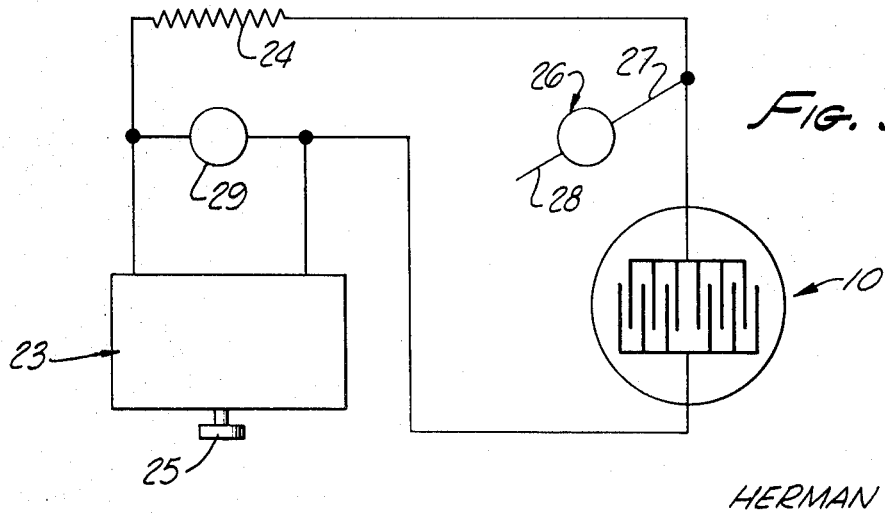
FIG. 3 is a schematic diagram of apparatus for applying an alternating voltage to the electrodes of the capacitor.

While still at room temperature and now at a pressure of about $10^{-3}$ torr, an alternating voltage is applied across the plates of capacitor 10, as shown in FIG. 3. An adjustable AC source 23 is connected through a current-limiting resistor 24 across capacitor 10. The output voltage of source 23 is manually adjustable with knob 25. A neon tube 26 serves as a voltage indicator and has one lead 27 connected on one side of capacitor 10. Neon tube 26 also has a lead 28 which is preferably grounded, but may be left dangling. Stray capacitance completes the circuit to lead 28. When the capacitor 10 arcs over, neon tube 26 will light.

In accordance with the present invention, vacuum capacitors are preferably processed by manually controlling source 23.

In processing capacitor 10, the output voltage of source 23 is gradually increased from zero by turning knob 25 until tube 26 begins to light indicating a voltage breakdown in the capacitor. Preferably, the output voltage of source 23 is maintained sufficiently low so that tube 26 does not light more than about once every five seconds. Knob 25 may be then left stationary for a short time until tube 26 ceases to light at all. Knob 25 may be then turned, and the process repeated at higher voltages. The process is repeated until a desired maximum voltage is indicated by meter 29. Knob 25 is then left stationary at the maximum voltage again until tube 26 ceases to flash.

The maximum peak voltage at which a capacitor should be processed in accordance with the present invention will generally be determined only by the spacing between the capacitor electrodes. This spacing is preferably uniform throughout the capacitor. The maximum voltage, V, is preferably such that $V/d$ is approximately between 1,000 and 1,500 volts per mil, where $d$ is the spacing between the capacitor electrodes.

Since by conventional processing, the pressure inside envelope 11 will be $10^{-6}$ torr or lower, admitting the inert gas through valve 21 will tend to raise the pressure inside envelope 11. Valve 21, thus, may be cracked at intervals to maintain the desired pressure inside envelope 11 near $10^{-3}$ torr. If desired, capacitor 10 may be left connected to pump 19 during all of the steps described hereinbefore; and in this case, a continuous supply of gas may be provided through a microvalve, replacing valve 21.

Typical inert gases which may be used are helium, neon, argon, krypton, xenon, nitrogen, and hydrogen.

Preferably, resistor 24 has a resistance sufficiently large to limit arcing current to 10 milliamperes. Source 23 may be a high impedance transformer. Preferably, the method of the present invention is employed in processing capacitors having a spacing from about 0.01 to 0.25 inch.

The last step of the invention is to seal up tube 15 without increasing the temperature of capacitor 10 above room temperature and while the inert gas is left inside envelope 11 at the processing pressure of about $10^{-3}$ torr. Alternatively, shortly before tube 15 is sealed up, the pressure inside envelope 11 is reduced from about $10^{-3}$ torr to about $10^{-6}$ torr. The operation does not apparently reduce the inert gas adsorbed on the surface of the capacitor electrodes because the pressure is reduced only at room temperature and not at an outgassing temperature.

The method of the present invention is not limited to any particular capacitor electrode geometry. For example, flat, grooved, cylindrical, or spiral electrodes may be employed.

Typical capacitors, variable or fixed, to which the invention is applicable are disclosed in U.S. Pat. Nos. 3,257,590 and 3,337,531.

Due to the fact that rather high vacuums are employed, envelope 11 is hermetically sealed in the conventional way.

In general, all of the component parts employed in the fabrication of capacitor 10 will be made of copper or of a ceramic.

The frequency of source 23 may be 60 Hz. However, this frequency is by no means critical. It is generally used only because it is the frequency of commercially available power.

When the output voltage of source 23 is increased by turning knob 25, knob 25 will be turned gradually. However, as stated previously, knob 25, in steps will be maintained stationary until the maximum voltage is reached. Knob 25, for a short time, is also maintained stationary while the output voltage of source 23 is at its maximum value.

Although less practical, a DC voltage source may be used for processing by supplying DC voltages of opposite polarities alternately to the opposite electrodes of capacitor 10. In this case, good results apparently take place when the maximum current to the capacitor is about 100 microamperes.

It is important that the temperature of capacitor 10 not be increased by a further bakeout when all steps, except the sealing of tube 15, have been performed as the inert gas adsorbed at the capacitor plates is removed by raising their temperature. The improvements described and the increased useful life provided by the method of the present invention are not achieved if a conventional bakeout is performed after the high voltage processing of capacitor 10. For the same reasons, subsequent high voltage processing under high vacuum would be extremely detrimental.

As stated previously, vacuum capacitors processed by prior art techniques are not stable for any practical periods of time when subjected to DC or combined DC and RF voltages. However, vacuum capacitors processed in accordance with the method of the present invention have been tested for 1,000 hours under combined DC and RF conditions and have not arced over or shown any other degradation. Therefore, they do not fail under such conditions as the vacuum capacitors processed by the prior art techniques fail.

Typically, when the output voltage of source 23 has been increased to the desired maximum value, it is left there from one to five minutes. The same may be true of prior steps, although the time at which knob 25 is left stationary may vary a great deal from step to step and from capacitor to capacitor.

It is believed the method of the present invention is contrary to accepted practice because great care is normally used to remove all gases from a vacuum capacitor, and it would normally be unacceptable purposely to introduce a gas to a vacuum capacitor and leave it in the capacitor when it is sealed.

The invention is not restricted to the processing of vacuum capacitors as the improvements described are also obtained in other vacuum devices which are operated at high voltages.

What is claimed is:

1. The method of making a vacuum capacitor having insulated electrodes in a hermetically sealable envelope, said method comprising the steps of: heating the capacitor to an outgassing temperature; pumping the liberated gases outside said envelope until the pressure inside thereof falls to a predetermined magnitude; reducing the temperature of said capacitor; admitting a trace of an inert gas to the interior of said envelope at said reduced temperature; applying an alternating voltage to the electrodes of said capacitor while said inert gas is inside said envelope at said reduced temperature; and hermetically sealing said envelope closed at said reduced temperature while said inert gas remains in said envelope.

2. The method of producing a vacuum capacitor which includes insulated electrodes in a hermetically sealable envelope, said method comprising the steps of: heating the capacitor to an outgassing temperature; pumping the liberated gases from said envelope down to a pressure of approximately $10^{-4}$ torr or less; cooling said capacitor to approximately room temperature; admitting an inert gas, selected from a group of gases consisting of helium, neon, argon, krypton, xenon, nitrogen and hydrogen, into said envelope at said room temperature until the pressure inside said envelope increases to about $10^{-3}$ torr; applying an alternating voltage to the electrodes of said capacitor while said inert gas is inside said envelope at said reduced temperature, said voltage being increased gradually at a rate causing arc-over between said capacitor electrodes not more frequently than about once in five seconds; and hermetically sealing said envelope at said room temperature, said admitted inert gas remaining in said envelope.

3. The method of claim 2, wherein said sealing step is preceded by a step of reducing the pressure in said envelope to about $10^{-6}$ torr.

4. The method of claim 2, wherein said voltage is increased to a maximum value, V, such that $V/d$ is approximately between 1,000 to 1,500 volts per mil, where $d$ is the spacing between said capacitor electrodes, said sealing step being preceded by a step of reducing the pressure in said envelope to about $10^{-6}$ torr.

5. The method of claim 1, wherein the pressure in said envelope is pumped down at least to about $10^{-4}$ torr, said inert gas being admitted until the pressure in said envelope rises to about $10^{-3}$ torr, said voltage being increased gradually to minimize the frequency of arc over between said electrodes.

6. The method of claim 5, wherein said voltage is increased to a maximum value, V, such that $V/d$ is approximately between 1,000 to 1,500 volts per mil, where $d$ is the spacing between said capacitor electrodes.

7. The method according to claim 1 in which said inert gas is admitted to said capacitor to a point of pressure close to but below the point of pressure resulting in substantial ionization.

References Cited

UNITED STATES PATENTS

| | | | |
|---|---|---|---|
| 3,346,933 | 10/1967 | Lindsay | 317—244 |
| 3,155,887 | 11/1964 | Barnes | 317—245 |
| 2,524,000 | 9/1950 | Spencer | 29—25.41 |

JOHN F. CAMPBELL, Primary Examiner

C. E. HALL, Assistant Examiner

U.S. Cl. X.R.

317—244